Dec. 30, 1958 J. A. FORMBY 2,866,931

SYNCHRONOUS TRANSMISSION SYSTEMS

Filed Aug. 23, 1955 2 Sheets-Sheet 1

JOHN ALBERT FORMBY
INVENTOR.
by RICHARDSON, DAVID & NORDON
HIS ATTORNEYS

Dec. 30, 1958 | J. A. FORMBY | 2,866,931

SYNCHRONOUS TRANSMISSION SYSTEMS

Filed Aug. 23, 1955

2 Sheets-Sheet 2

JOHN ALBERT FORMBY
INVENTOR.

by RICHARDSON, DAVID & NORDON
HIS ATTORNEYS 2,866,931

SYNCHRONOUS TRANSMISSION SYSTEMS

John Albert Formby, Moseley, Birmingham, England

Application August 23, 1955, Serial No. 529,979

Claims priority, application Great Britain August 27, 1954

11 Claims. (Cl. 318—23)

Figure 1A:
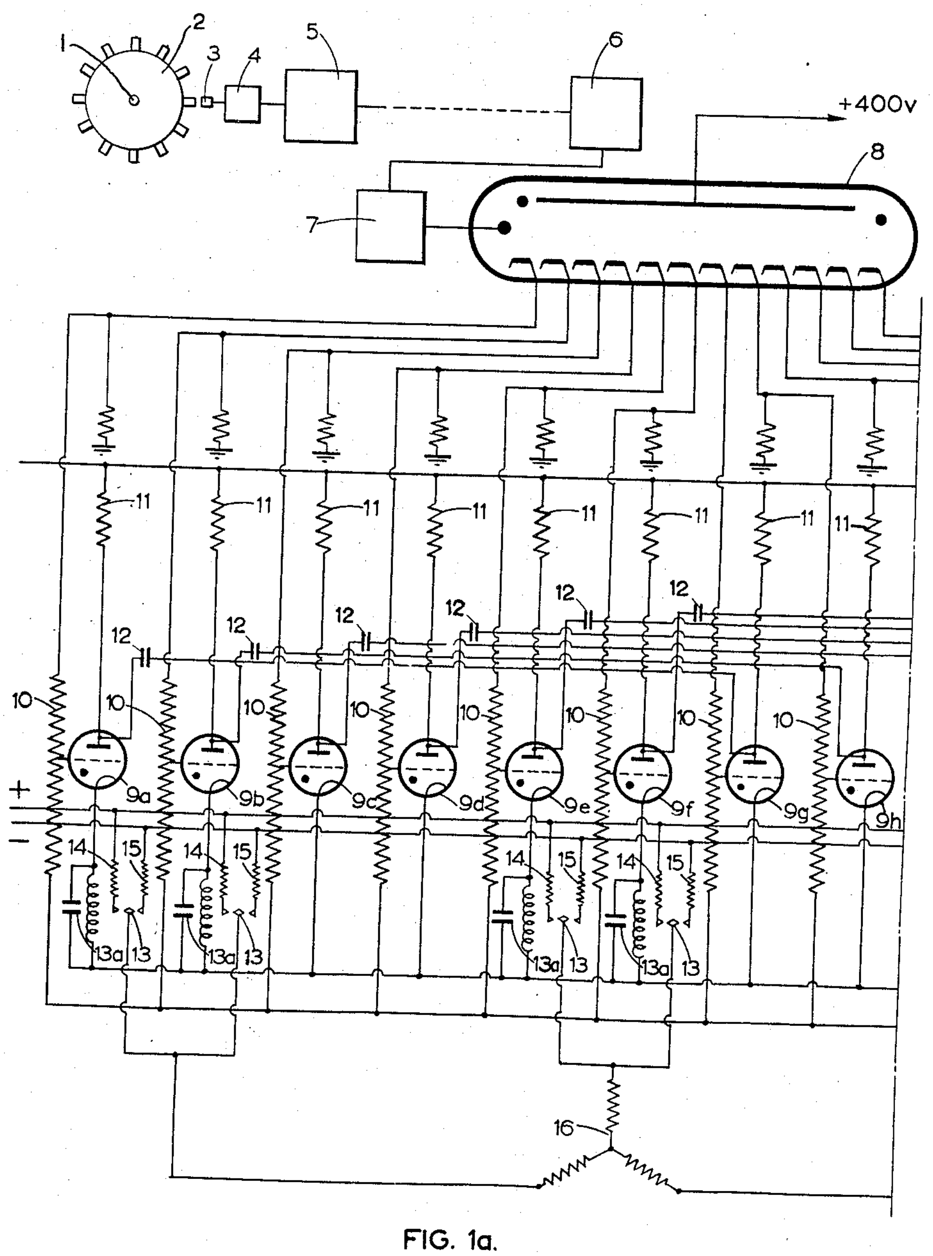

This invention relates to synchronous transmission systems and provides a means whereby a rotary movement may be imparted to a shaft by electrical or telecommunications means in response to a sequence of pulses, the said pulses being derived from any suitable form of rotary generator or tape or like record bearing member, the pulses being in general, not generated in equal intervals of time when the record bearing member moves at constant speed, although the arrangement can equally well be such that the pulses are generated at equal or substantially equal intervals of time, e. g. when the pulse initiating means is a keyboard operated instrument such as a typewriter.

According to the present invention, a step type motor adapted to drive a rotatable shaft has energising currents applied to it subject to the control of an electronic multichannel selector adapted to control the distribution of the said currents discriminately in operational sequence to the windings of the motor.

Pulses can be transmitted to the said selector from any suitable form of rotary pulse generator, which may be adapted to rotate at constant speed, or any suitable tape or the like moving at constant speed, although the said pulses are not necessarily generated in equal intervals of time.

In one form of the invention the movement of a step type motor is controlled by purely telecommunications means from a rotating disc having a set of holes equidistant from the axis, but not in general equally spaced round the circumference, a light source on one side and a photo-electric cell on the other so that a pulse drives the motor one step corresponding to each hole of the set. Thus, the invention provides for the motor shaft to turn at a non-constant speed when the disc is rotating at constant speed, so providing a form of electrical drive analogous to non-circular gear trains.

In another form of the invention, a step type motor is caused to rotate in response to a series of spots on a magnetic track or holes in a tape or the like, one step of the motor corresponding to each spot or hole, so that means is provided to create or to reproduce any desired mode of motion by the prior creation of a suitable sequence of spots on a tape.

In particular, the invention provides a means by which a magnetic tape or the like may be accelerated in a controlled manner from rest to a constant speed, carried through a prescribed distance and then brought to rest with a controlled decelleration, the overall movement of the tape being accurately controlled by means of a second tape or track moving at constant speed throughout. As an alternative to the constant speed tape, a predetermined number of pulses may be applied to the step motor by any suitable means, as for example, by a pre-set counter and thus the magnetic tape may be moved through a definite number of steps corresponding to the number of pulses so applied.

In all forms of the invention there is no load imposed on the record bearing member by the step motor, so that the invention is adapted to be used in association with delicate mechanisms which could not themselves do any substantial work. Thus, for example, the carriage of an ordinary typewriter may, by this means, be caused to drive a small disc or wheel through an auxiliary rack and pinion mechanism, and thus control the movement of a motor driving a recording tape, without mechanical strain, one step of the motor corresponding to each space movement of the typewriter carriage.

In order that the invention may be more clearly understood, it will first be described by reference to a block diagram and thereafter the circuit details associated with two distinct embodiments will be shown.

Figure 2:
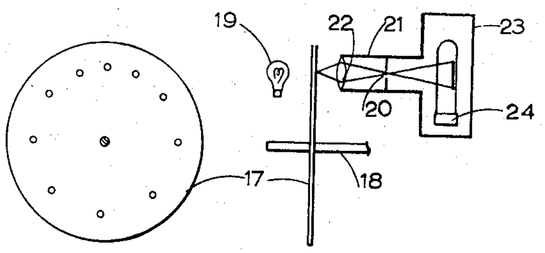
Figure 1B:
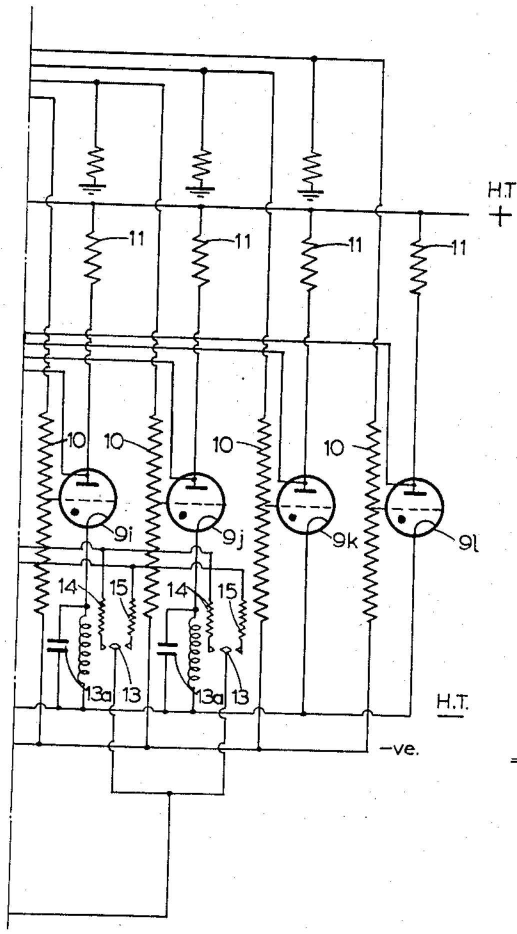
Figure 3:
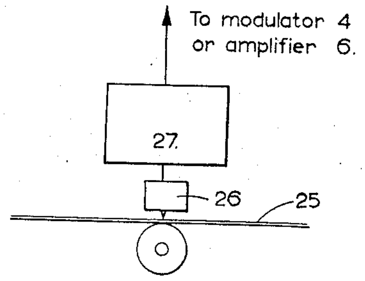

Figures 1*a* and 1*b* show a block diagram illustrating a generalized form of the invention, Figure 2 shows an optical generator comprising a disc bearing a set of holes adapted to transmit light from a suitable lamp on one side to a suitable photo-electric cell on the other, Figure 3 shows a magnetic tape bearing spots, together with a suitable magnetic transducing head and amplifier as alternative to the optical generator of Figure 2.

Referring to Figure 1, a rotary generator 1 is shown purely diagrammatically on a shaft 2 and having a set of twelve pulse generating means 1*a* on its periphery, not necessarily equally spaced, and adapted, in the course of one revolution of the generator 1, to transmit twelve pulses to an amplifier 3 and thence to a modulator 4 associated with a valve oscillator 5, the modulated output being applied to a line or to a radio link L. At the remote end of the line, or link, the received signals are applied to a detecting means 6 and the pulses so detected are applied to an amplifier and pulse shaper 7 and thence to a gas glow selector tube 8, having twelve externally connected cathodes. These cathodes are connected to the respective control grids of twelve thyratron type valves 9*a, b, c, d, e, f, g, h, i, j, k, l* by means of suitable high resistance potentiometers 10, one end of each potentiometer being connected to a cathode of the selector tube, the other end to a point of negative potential relative to the thyratron H. T. —v. e. supply and the tapping point to the control grid of the thyratron (the resistance must be sufficiently large to ensure that the selector tube, which may be of the type GS 12C manufactured by Messrs. Ericsson Telephones Ltd. is not excessively loaded). This type of selector tube, as is well known, has been developed in recent years for the purpose of counting successive pulses applied to it, or alternatively, of selecting one of a multiplicity of output points according to the number of pulses applied to it. In order that its application to the present invention may be clearly understood, it should be stated that when electric power is applied to such a tube, one only of its cathodes is caused to carry a glow. On application of a pulse, the glow transfers itself from the first cathode to the next adjacent cathode in a prescribed direction, and as successive pulses are applied, the glow steps from cathode to cathode unidirectionally. In the present application it is also to be understood that a sequence of twelve pulses should be applied to the selector tube in order to establish the correct sequence of operations, before the power supply to the step type motor is switched on. Thereafter, each successive pulse applied to the selector tube will cause the motor to execute one step, as will appear. Each thyratron is connected via a capacitance 12 to the anode of another valve of the set. Thus, numbers 9*a*, 9*g*; 9*b*, 9*h*; 9*c*, 9*i*; 9*d*, 9*j*; 9*e*, 9*k*; 9*f*, 9*l*; are connected, the associated parts functioning as mutual quenchers. Valves 9*a*, 9*b*; 9*e*, 9*f*; 9*i*, 9*j*; have as cathode loads the operating coils of high speed relays 13 in shunt with suitable capacitances 13*a*. The remaining cathodes are connected direct to H. T. —v. e. Each "on" point is connected via a resistance 14 to the positive power supply for an M-type motor and each "off" point is likewise connected via a resistance 15 to the negative power supply. The centre points are connected in pairs and each pair is connected to one of the three stator windings of an M-type motor 16.

The M-type motor is of a well-known direct current, multicircuit, stepped current type, having three stator windings, star connected, and a rotor having an axis of minimum magnetic reluctance, which, for any given distribution of stator currents, is adapted to set itself in a definite angular direction in relation to these. If the distribution of stator currents is altered, then the rotor takes up a new angular position corresponding to the new distribution. By applying voltages to the stator windings in a sequence of twelve steps, in accordance with the following scheme, the rotor may be caused to turn through one revolution in a corresponding sequence of twelve steps.

| Step | 1 | 2 | 3 | 4 | 5 | 6 | 7 | 8 | 9 | 10 | 11 | 12 |
|---|---|---|---|---|---|---|---|---|---|---|---|---|
| Stator 1 | + | + | D | − | − | − | − | − | D | + | + | + |
| Stator 2 | D | + | + | + | + | + | D | − | − | − | − | − |
| Stator 3 | − | − | − | − | D | + | + | + | + | + | D | − |

where + indicates positive voltage, − indicates negative voltage and D indicates dead.

Such a step type motor is well known in synchronous transmission systems where it is used in conjunction with a transmitter, having a rotary member, and adapted to supply the necessary voltages to the stator windings to cause the motor to step in substantial synchronism with the rotary member of the transmitter.

In such a system, in order to generate any particular type of motion in the step motor or receiver, it is necessary first to generate the required type of motion in the rotary member of the transmitter. The present invention dispenses with that necessity and provides for the use of an electronic pulse source, which need not be dependent on a rotary, or non uniformly moving member, in order to generate a non-uniform motion in the step motor.

Each stator winding being associated with two relays 13 aforesaid is effectively connected to the positive power supply or is "dead" or is connected to the negative power supply, according as both, or one only, or neither of the associated valves 9 is conducting. Each of these valves strikes in sequence and is quenched after six steps when its associated valve strikes, while on striking it causes its associated valve to be quenched. Thus, each stator winding is connected to the positive supply for five consecutive steps, becomes "dead" in the course of one step, is connected to the negative supply point for five consecutive steps and again becomes "dead" in the course of the next step and thereafter the cycle repeats. The cycle of steps asociated with the first stator winding is repeated in the second four steps later and in the third eight steps later. Thus, the M-type motor moves in substantially the same manner as if it had been energised in the well known way by means of an M-type transmitter, and is substantially synchronised with the rotation of the generator 1 at the local point.

It is evident that the invention as described above, provides for the M-type motor to make one revolution in twelve steps, corresponding to the twelve pulses per revolution of the generator 1, thus providing an average speed ratio of 1:1. However, it is to be noted that the speed ratio is constant only if the pulse generating means 2 are equally spaced round the circumference of the generator 1. When this is not the case, then the generator 1 and the motor shaft behave substantially as if they were connected by non-circular gears.

Referring to Figure 2, the generalized rotary generator of the block diagram is replaced by a rotatable disc 17 on a shaft 18 and having a set of holes equi-distant from the centre of the disc but not, in general, equally spaced round the circumference. On one side of the disc is a small lamp 19, preferably supplied by direct current so as to achieve constant intensity of illumination. On the other side is an optical slit 20 mounted in a metal tube 21 and provided with a lens 22 such that an image of the disc surface may be focussed on the optical slit. At the end of the tube remote from the disc it enters a light-tight box 23 containing a photo-electric multiplier 24, the output of which is applied to any suitable modulator 4 and hence to the oscillator 5 such as shown in Figure 1, and thence pulses corresponding each to a hole in the disc are applied to the line or radio link L and thence to the amplifier and pulse shaper 6. Alternatively, the output of the photo-multiplier may be applied directly to the amplifier and thence to a pulse shaping stage, of a conventional kind, as recommended by Messrs. Ericsson Telephones Ltd. in their technical literature and thence to the cold cathode gas glow tube type GS 12C. The cathodes of this valve are connected to thyratron valves in the manner shown in Figure 1.

Thus, the gas glow tube receives a pulse corresponding to each passage of a hole of the disc past the image of the optical slit, so transmitting a pulse, in the manner described to the said gas glow tube and thus causing the M-type motor to rotate through one step.

It will be obvious that the holes in the disc need not be equally spaced, and that if the disc rotates at constant speed, then as the holes become more widely spaced the M-type motor will slow down and as they become more narrowly spaced the motor will speed up. A substantial part of the disc having no holes will give rise to a "dwell" in the motion of the M-type motor. Thus, provided that the disposition of the holes is not such as to impose excessive accelerations on the M-type motor, having regard to its load, the said motor will move substantially in correlation with the passage of the holes across the optical slit image as aforesaid.

Referring to Figure 3, the optical generating means of Figure 2 is replaced by a magnetic tape 25 with reproducing magnet 26 and amplifier 27 such as may be found in an ordinary tape deck recorder. A series of spots may be recorded on the tape according to any desired scheme in order to produce a desired motion of the M-type motor. For example, there might be no record on the tape in that part which passes under the reproducing magnet before constant speed of motion is reached, and thereafter spots may be recorded at increasingly close intervals until a certain spot density is reached, thereafter further spots may be recorded at equal intervals along the tape and then, finally, the spots may become gradually more sparce until finally a blank portion of the tape is again reached. Thus, each spot, as it passes under the reproducing magnet gives rise to a pulse, which after suitable amplification at the magnetic amplifier 27 and further amplification in the manner described in relation to Figure 2, is applied to the gas glow tube as described in connection with Figure 2. Thus, in the course of one passage of the tape under the magnet, the M-type motor starts from rest and accelerates in a controlled manner until a constant speed is reached, remains at a constant speed of rotation for a predetermined angular displacement, and then returns in a controlled manner gradually to rest, the total number of steps being in agreement with the number of spots on the tape.

It will be obvious to those skilled in the electronic art that, using well known switching techniques, it is possible to control an M-type motor by means of the invention above described, so that any one of a multiplicity of sets of holes in a disc (or of holes in distinct discs moving in correlation with each other) may be caused to control the movement of the motor during one or more revolutions. Thus, for example, one set of holes may represent acceleration of the motor from zero to some constant speed, while another set might represent the reverse motion, and likewise a disc and set of holes might represent a controlled acceleration from one constant speed to another. Thus, a tape or the like may be moved in a controlled manner from rest to a constant speed, maintained at this speed for a predetermined distance of travel and then brought in a controlled manner back to rest again, making use of sets of discs as described in connection with Figure 2 as an alternative to the tape deck of Figure 3.

The input for the selector tube 8 when it is of the aforesaid G.S. 12C type manufactured by Ericsson Telephones Limited is, of course, known and particulars thereof and of the valve itself can be found in the handbook "Cold Cathode Tubes," 1954/5, published by such company.

I claim:

1. In a synchronous transmission system for imparting rotation to a rotary output member, a step type electric motor driving the output member, a pulse initiating member, means associated with said pulse initiating member by which the pulses generated occur at irregular intervals of time, and a pulse driven electronic multi-channel selector controlling the distribution of energising voltages to the windings of the motor, in synchronism with the irregularly occurring pulses, so causing the motor to step in a correspondingly irregular manner.

2. In a synchronous transmission system for imparting rotation to a rotary output member, a step type motor driving the output member, a constant speed unidirectionally driven pulse initiating member, means associated with said pulse initiating member by which the pulses generated can occur at irregular intervals of time, and a pulse driven electronic multi-channel selector controlling the distribution of energising voltages to the windings of the motor, in synchronism with the said occuring pulses, so causing the motor to step in a correspondingly irregular manner.

3. A synchronous transmission system as claimed in claim 2 wherein the constant speed uni-directionally moving pulse initiating means comprises a constant speed rotating member with a succession of pulse producing zones arranged at intervals in a circular track.

4. A synchronous transmission system according to claim 3 wherein the said pulse producing zones are spaced at irregular intervals.

5. A synchronous transmission system according to claim 3 wherein the constant speed pulse initiating means comprises a light source, a succession of gaps provided at irregular intervals in a circular path in a rotor, and a photo-electric cell receiving light from said source through said gaps.

6. A synchronous transmission system according to claim 3 wherein the constant speed pulse initiating means comprises a light source, a succession of gaps provided at intervals along a constant speed driven tape, and a photo-electric cell receiving light from said source through said gaps.

7. A synchronous transmission system according to claim 3 wherein the constant speed pulse initiating means comprises a rotary generator, with a succession of spaced generating means on its periphery.

8. A synchronous transmission system for imparting rotation to a rotary output member at a non-constant speed, comprising a step type electric motor driving said rotary output member, a constant speed uni-directionally driven pulse initiating member, a succession of irregularly spaced pulse producing zones with said latter member, and a pulse driven electronic multi-channel selector controlling the distribution of energising voltages to the windings of the motor in a sequence of steps in substantial synchronism with the sequence of generation of the said pulses.

9. A synchronous transmission system for imparting rotation to a rotary output member at non-constant speed, comprising a constant speed uni-directionally driven generator, a succession of irregularly spaced pulse generating zones with said generator, an amplifier to which the said pulses are transmitted, a modulator receiving from the amplifier the amplified pulses, an oscillator fed from said modulator, detecting means receiving signals from said oscillator, a pulse shaper amplifying the detected pulses, a gas glow pulse operated selector tube to which the pulse shaper is connected, an even number of thyratron valves corresponding in number to the number of cathodes in said selector tube, individual connections from said cathodes to the grids of said valves, each said connection containing a high resistance potentiometer off which the associated grid is tapped, the anode of each of said thyratrons being connected to the anode of a distinctive one of the remaining thyratrons to provide a plurality of associated pairs functioning as mutual quenchers, an M-type electric motor, a number of high speed relays in the cathodes of one half of said thyratrons the "on" points of which connect to the positive power supply of said motor and the "off" points of said relays being connected to the negative power supply, and the centre points of said relays being connected in pairs to distinctive ones of the stator windings of said motor.

10. The synchronous transmission system of claim 1 in which the pulse initiating member is a magnetisable tape having magnetised portions distributed in an irregular manner and a transducer, said tape being moved past said transducer at a constant speed.

11. A synchronous transmission system for imparting rotation to a rotary output member at a non-constant speed, comprising a constant speed uni-directionally driven generator, a plurality of pulse generating zones irregularly distributed on said generator thereby to produce an irregular train of pulses, amplifying means for said pulses, a pulse operated gas glow selector tube having twelve operative cathodes, twelve thyratrons, individual connections from said selector tube cathodes to the thyratron grids, pair-wise connections of the anodes of the thyratrons whereby each thyratron forms a mutual quencher for another thyratron in such manner that sequential excitation of the selector tube cathodes causes sequential striking of the thyratrons and after an interval of six pulses sequential quenching, a high speed relay in the cathode circuit of one thyratron of each pair of thyratrons, two fixed contacts and one movable contact with each said relay, sequential pairwise connections between the movable contacts of the six relays, an "M" type electric motor having three stator windings one such winding being connected to each contact pair, and positive and negative motor supply leads to said fixed contacts such that sequential selector tube operation causes sequential positive, through zero to negative voltages on said stator windings to cause said motor to step sequentially in synchronism.

References Cited in the file of this patent

UNITED STATES PATENTS

| | | |
|---|---|---|
| 1,941,615 | Mirick | Jan. 2, 1934 |
| 1,941,627 | Schramm | Jan. 2, 1934 |
| 2,414,787 | Post | Jan. 21, 1947 |
| 2,787,719 | Thomas | Apr. 2, 1957 |

FOREIGN PATENTS

| | | |
|---|---|---|
| 626,399 | Great Britain | July 14, 1949 |
| 961,670 | France | Feb. 1, 1950 |